(12) United States Patent
Bohm et al.

(10) Patent No.: US 9,690,548 B2
(45) Date of Patent: *Jun. 27, 2017

(54) ENHANCED MANAGEMENT OF THREAD-LOCAL OBJECTS

(71) Applicant: International Business Machines Corporation, Armonk, NY (US)

(72) Inventors: Fraser P. Bohm, Salisbury (GB); Ivan D. Hargreaves, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,682

(22) Filed: Mar. 18, 2016

(65) Prior Publication Data

US 2017/0090880 A1    Mar. 30, 2017

Related U.S. Application Data

(63) Continuation of application No. 14/867,105, filed on Sep. 28, 2015.

(51) Int. Cl.
    *G06F 9/52* (2006.01)
    *G06F 9/44* (2006.01)
(52) U.S. Cl.
    CPC . *G06F 8/31* (2013.01); *G06F 8/70* (2013.01)
(58) Field of Classification Search
    None
    See application file for complete search history.

(56) References Cited

U.S. PATENT DOCUMENTS

| | | | | |
|---|---|---|---|---|
| 5,752,031 A | * | 5/1998 | Cutler | G06F 9/52 718/103 |
| 2002/0129306 A1 | * | 9/2002 | Flanagan | G06F 9/524 714/100 |
| 2007/0150509 A1 | * | 6/2007 | Lev | G06F 9/466 |
| 2013/0257163 A1 | * | 10/2013 | O'Brien | H02J 3/383 307/82 |

OTHER PUBLICATIONS

IBM Appendix P, list of patents and patent applications treated as related, Mar. 18, 2016, 2 pages.

(Continued)

*Primary Examiner* — Emerson Puente
*Assistant Examiner* — Zhi Chen
(74) *Attorney, Agent, or Firm* — Steven F. McDaniel

(57) ABSTRACT

As disclosed herein a method, executed by a computer, includes receiving a request to instantiate an instance of a thread-local manager for a particular thread, instantiating the instance of the thread-local manager, and providing global visibility to the instance of the thread-local manager. The method further includes manipulating thread-local variables corresponding to the particular thread and removing all the thread-local variables when the particular thread completes a task. A computer system and computer program product corresponding to the above method are also disclosed herein.

6 Claims, 4 Drawing Sheets

(56) References Cited

OTHER PUBLICATIONS

Attouchi et al., "Memory Monitoring in a Multi-tenant OSGi Execution Environment", CBSE'14—17th international ACM Sigsoft symposium on Component-based software engineering, Jun. 2014, Marcq-en-Baroeul, France, CSBE'14, Jun. 30-Jul. 4, 2014, ACM 978-1-4503-2577-6/14/06, pp. 1-11, <http://dx.doi.org/10.1145/2602458.2602467>.

IBM, "IBM CICS Transaction Server for z/OS, V5.3 open beta offering delivers advances in service agility, operational effciency, and cloud enablement with DevOps", IBM Europe, Middle East, and Africa Software Announcement ZP15-0025, dated Feb. 17, 2015, pp. 1-13, "Grace Period Disclosure", <http://www-01.ibm.com/common/ssi/cgibin/ssialias?subtype=ca&infotype=an&appname=iSource&supplier=877&letternum=ENUSZP15-0025>.

Bohm et al., "Enhanced Management of Thread-Local Objects", U.S. Appl. No. 14/867,105, filed Sep. 28, 2015, 30 pages.

\* cited by examiner

_US 9,690,548 B2_

ENHANCED MANAGEMENT OF THREAD-LOCAL OBJECTS

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:
(1) IBM CICS Transaction Server for z/OS, V5.3 open beta offering delivers advances in service agility, operational efficiency, and cloud enablement with DevOps, IBM, Feb. 17, 2015, http://www-01.ibm.com/common/ssi/cgi-bin/ssialias?subtype=ca&infotype=an&appname=iSource&supplier=877&letternum=EN USZP15-0025.

BACKGROUND

The present invention relates to software development, and more particularly to enhanced management of Java thread-local objects.

In the computer programming industry, a thread is a part of a running computer program (e.g., a computer process or task) that can execute independently of other parts of the computer program. A thread pool is a group of pre-instantiated threads that are reused as tasks become available for execution. When the task completes, the thread is returned to the thread pool and is available for use by another task. Multiple threads can execute concurrently within a single computer process. Concurrently executing threads may share some resources, while requiring exclusive access to other resources.

A thread-local object is an object that is bound to a specific thread, meaning the object is accessible only to the thread for which it was created. A thread-local variable is a variable within a thread-local object that can only be seen (i.e., accessed) by the thread that created the thread-local object.

SUMMARY

As disclosed herein a method, executed by a computer, includes receiving a request to instantiate an instance of a thread-local manager for a particular thread, instantiating the instance of the thread-local manager, and providing global visibility to the instance of the thread-local manager. The method further includes manipulating thread-local variables corresponding to the particular thread and removing all the thread-local variables when the particular thread completes a task. A computer system and computer program product corresponding to the above method are also disclosed herein.

DETAILED DESCRIPTION

In today's highly computerized society, computing devices are becoming faster and more powerful. One measure of computer performance is the amount of work that a computer can do in a given period of time (i.e., throughput). One approach to increasing throughput on a computing device is to support multi-threaded execution. When a computer application is running in a multi-threaded environment, extra care must be taken to assure that data owned by one thread is not accidentally exposed to another thread executing on the same computing device.

To avoid the overhead associated with repeatedly creating threads, many computing environments provide a thread pool. A thread pool can be a collection of previously created threads that may be assigned to a task or process (e.g., part of a computer program) that is ready to be executed. When the task completes, the thread is returned to the thread pool and becomes available to be used by another task.

The use of thread-local objects and variables is one technique of assuring that data is only visible (i.e., accessible) to a particular thread. If a thread creates a thread-local object, the thread-local object is bound to the thread and is accessible only to the thread for which it was created. A thread-local object may contain thread-local variables that can only be seen (i.e., accessed) by the thread that created the thread-local object.

After a task that is using a thread has completed, yet prior to the thread being returned to the thread pool, all thread-local variables associated with the thread must be deleted (e.g., removed) so that the next task to use the thread will not have visibility to any data from a task that had previously used the thread. Software frameworks may impose visibility restrictions during execution of a task, which may result in the creation of thread-local variables that are not visible to other portions of the task executing in the thread. Prior to returning the thread to the thread pool, all thread-local variables should be removed. However, if inaccessible thread-local variables exist, then it is possible that a clean-up routine may not be able to remove any thread-local variables with restricted visibility.

It has been determined that using thread-local variables in conjunction with software frameworks that may impose visibility restrictions may unintentionally expose data between tasks running on a computing device. The embodiments disclosed herein generally address the above-described problems.

Figure 1:
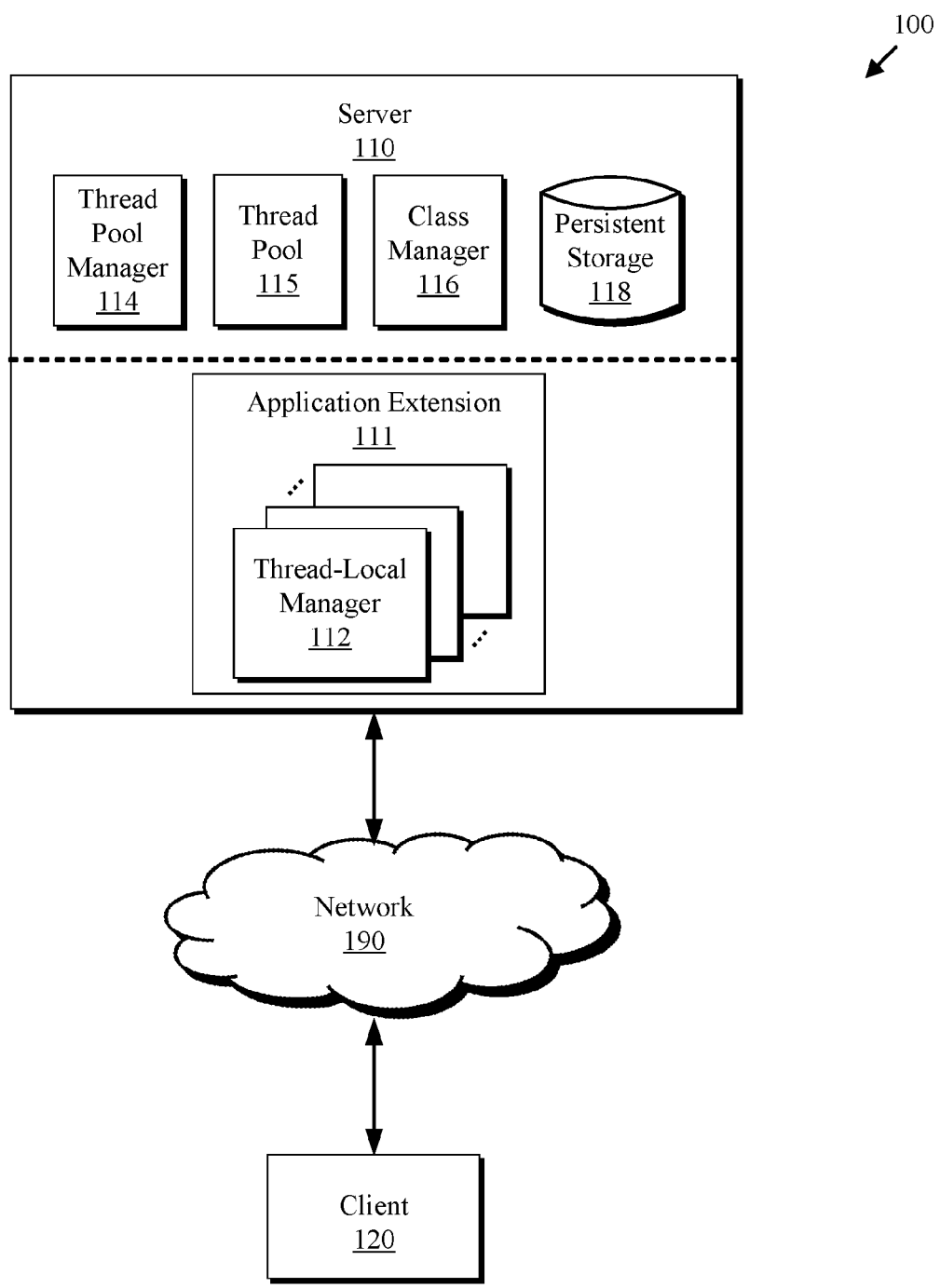
FIG. 1 is a functional block diagram depicting a computing environment, in accordance with at least one embodiment of the present invention.

The present invention will now be described in detail with reference to the Figures. FIG. 1 is a functional block diagram depicting a computing environment 100, in accordance with an embodiment of the present invention. Computing environment 100 includes server 110 and client 120, which can include smart phones, tablets, desktop computers, laptop computers, specialized computer servers, or any other computer systems, known in the art, capable of communicating over network 190. In general, server 110 and client 120 are representative of any electronic devices, or combination of electronic devices, capable of executing machine-readable program instructions, as described in greater detail with regard to FIG. 4.

As depicted, server 110 includes an application extension 111, a thread-local manager 112, a thread pool manager 114, a thread pool 115, a class manager 116 and persistent storage 118. Server 110 may be a web server, an application server, or any computing device capable of performing multi-threaded processing. Thread pool manager 114 may be configured to manage a collection of previously created threads (e.g., thread pool 115). Thread pool manager 114 may assign a thread from thread pool 115 to a task that is ready to execute on server 110. When the task has completed, thread pool manager 114 may assure that any thread-local variables are removed from the thread, and place the thread back in thread pool 115 to be assigned to another task.

Application extension 111 may be a supplementary routine that adds capabilities to an application. Application extension 111 includes thread-local manager 112. Thread-local manager 112 may be a singleton implementation of a thread-local object corresponding to a particular thread in thread pool 115. A singleton is an instantiation of a class object that is restricted, allowing the instance to create only one object of that class type. Additionally, thread-local manager 112 may reside in a memory location that enables thread-local manager 112 to have a global scope of visibility to all thread-local variables defined in the thread to which an instance of thread-local manager 112 corresponds. As depicted, application extension 111 may include more than one instance of thread-local manager 112, where each instance of thread-local manager 112 is a singleton object corresponding to a particular thread from thread pool 115.

Thread-local manager 112 may implement the same functionality and provide the same capabilities (e.g., methods, interfaces, and the like) that are provided by the native thread-local class (e.g., a native thread-local manager). Thread-local manager 112 may also provide additional functionality. In some embodiments, thread-local manager 112 implements a method that enables the removal of all thread-local variables corresponding to the current thread. In other embodiments, thread-local manager 112 implements a method that lists all existing thread-local variables, enabling each to be removed individually. Objects to be stored as thread-local variables may be passed to thread-local manager 112 via an application programming interface (API), allowing thread-local manager 112 to globally manage all thread-local variables associated with the currently running thread.

When a task is running in a thread from thread pool 115, the task may require the services of a framework managed by a class manager (e.g., class manager 116). Class manager 116 may be configured to control which classes are able to be loaded (i.e., visible) during the execution of the task. Although the depicted example shows a single instance of class manager 116, there may be multiple occurrences of class manager 116 representing different software frameworks (e.g., CICS®, WebSphere®, OSGi™, and the like).

Depending on the currently running task, class manager 116 may control which version of a class library, runtime library, or the like is visible to the task. In some embodiments, class manager 116 enables a running task to load version 3.0 of a runtime library. In other embodiments, class manager 116 enables a running task to load version 3.1 of the runtime library. While running under class manager 116, the task may be executing with restricted visibility. In some embodiments, class manager 116 uses application extension 111 and thread-local manager 112 to manipulate thread-local variables corresponding to the currently running task and thread. Using thread-local manager 112 may allow global visibility to thread-local variables that may otherwise have been inaccessible to thread pool manager 114. Differing versions of class libraries, runtime libraries, and the like that may be referenced by class manager 116 may be stored in persistent storage 118.

When the task has completed, all thread-local variables are removed from the thread prior to returning the thread to thread pool 115. Due to possible visibility restrictions, for example restrictions corresponding to actions performed by class manager 116, thread pool manager 114 may not have visibility to all thread-local variables that were created in the thread while the task was running. Thread-local manager 112 is created in a memory location that enables thread-local manager 112 to have a global scope of visibility of all thread-local variable defined in the thread. To assure that all thread-local variables are removed from the thread, thread-local manager 112 may be called to remove all thread-local variables from the thread. In some embodiments, the request to remove all thread-local variables is initiated by thread pool manager 114. In other embodiments, the request to remove all thread-local variables is initiated by application extension 111. After the thread-local variables are removed, thread pool manager 114 may place the thread back in thread pool 115.

Client 120 may be any client that communicates with server 110 over network 190. Client 120 may wish to use services provided by server 110. In some embodiments, client 120 uses an online banking application that is provided by server 110. In other embodiments, client 120 uses computational applications to produce analytics reports of customer demographic corresponding to a web application. In the depicted embodiment, server 110 and client 120 are separate computers. In other embodiments, server 110 and client 120 coexist on a single computer. Server 110 and client 120 may be procured from a cloud environment.

Persistent storage 118 may be any non-volatile storage media known in the art. For example, persistent storage 118 can be implemented with a tape library, optical library, one or more independent hard disk drives, or multiple hard disk drives in a redundant array of independent disks (RAID). Similarly, data on persistent storage 118 may conform to any suitable storage architecture known in the art, such as a file, a relational database, an object-oriented database, and/or one or more tables.

Server 110, client 120, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between server 110 and client 120 in accordance with an embodiment of the present invention.

Figure 2:
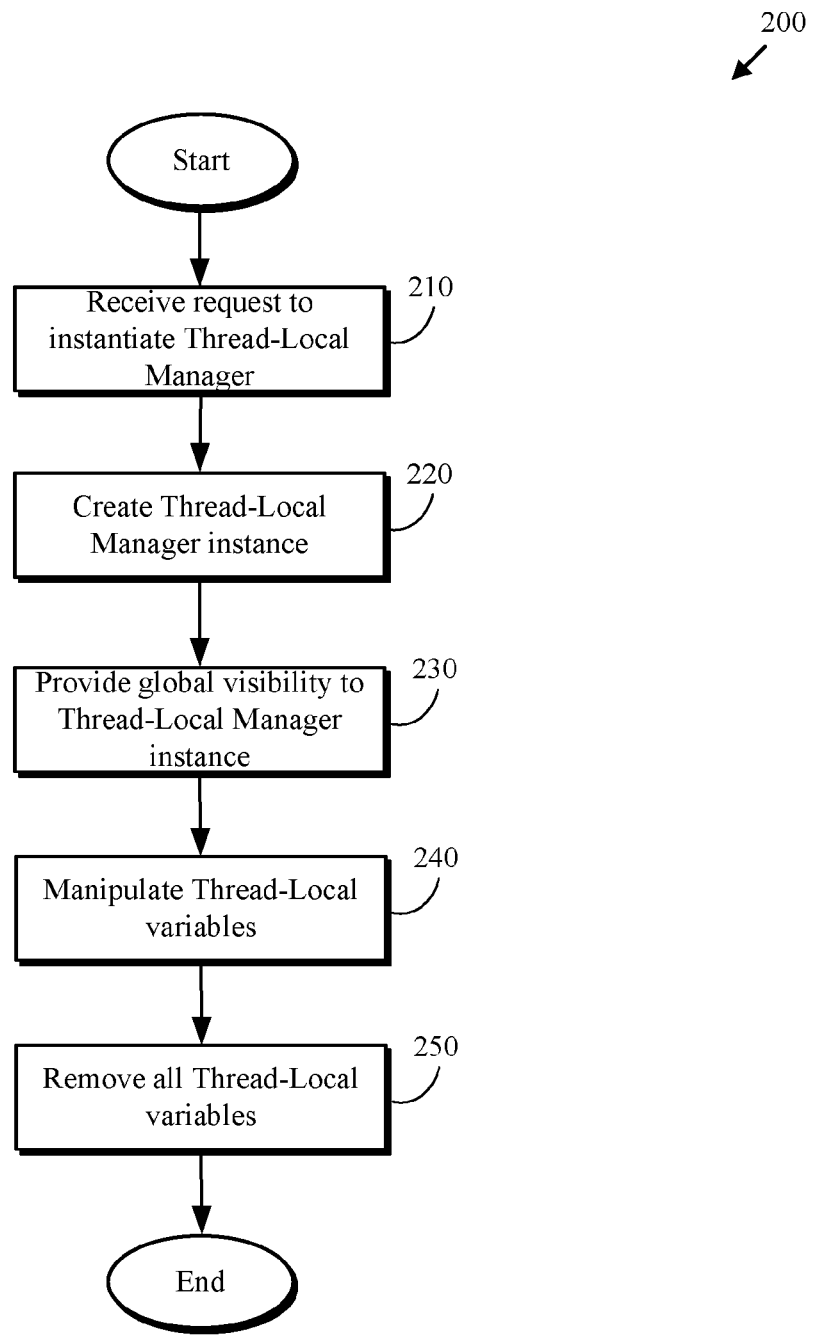
FIG. 2 is a flowchart depicting a thread-local management method, in accordance with at least one embodiment of the present invention.

FIG. 2 is a flowchart depicting a thread-local management method 200, in accordance with at least one embodiment of the present invention. As depicted, thread-local management method 200 includes receiving (210) a request to instantiate a thread-local manger object, creating (220) a thread-local manager object, providing (230) global visibility, manipulating (240) thread-local variables, and removing (250) all thread-local variables. Thread-local management method 200 enables a task to use thread-local variables on a thread from thread pool 115 and clean up all thread-local variables corresponding to the task prior to returning the thread to thread pool 115. Cleaning up all thread-local variables corresponding to the task may reduce the risk of unintentionally exposing data between tasks using the same thread at different times.

Receiving (210) a request to instantiate a thread-local manger object may include application extension 111 receiving from thread pool manager 114 a request to instantiate an instance of thread-local manager 112 for a specific thread in thread pool 115. In some embodiments, thread pool manager 114 populates thread pool 115, and thread pool manager 114 requests an instance of thread-local manager 112 for each thread in thread pool 115. In another embodiment, a new thread is created for a task that is ready to run on server 110, and a processor on server 110 requests an instance of thread-local manager 112 for the new thread.

Creating (220) a thread-local manager object may include application extension 111 instructing thread-local manager 112 to construct an instance of itself. In some embodiments, thread-local manager 112 constructs a singleton instance of itself and provides a reference to the newly create instance to application extension 111. In other embodiments, a singleton instance of thread-local manager 112 currently exists, and thread-local manager 112 provides a reference to the current instance to application extension 111. Application extension 111 may provide the reference to the thread-local manager object to the requester (e.g., thread pool manager 114).

Providing (230) global visibility may include application extension 111 providing an application programming interface (API) to the singleton thread-local manager 112 instance corresponding to the currently running thread. The API may expose, to the task currently running on the thread, standard thread-local functionality, as well as any additional functionality implemented by thread-local manager 112. Additionally, application extension 111 may reside in a location that provides thread-local manager 112 global visibility to thread-local variables corresponding to the thread for which thread-local manager 112 was created. Any task that creates thread-local variables may use thread-local manager 112 to manipulate the thread-local variables rather than using a native thread-local reference.

Manipulating (240) thread-local variables may include application extension 111 providing an instance of thread-local manager 112 that corresponds to a thread. Thread-local manager 112 may provide an API that enables the functionality required to manipulate thread-local variables corresponding to the thread. Any task executing on the thread that creates thread-local variables may use thread-local manager 112 to manipulate the thread-local variables rather than using a native thread-local reference. Manipulating thread-local variables may include calling thread-local manager 112 to initialize a thread-local object to a specific state, add (e.g., create) a thread-local variable, set (e.g., assign) a value to a thread-local variable, get (e.g., retrieve) a value from a thread-local variable, and/or remove (e.g., delete) a thread-local variable corresponding to the current thread.

Removing (250) all thread-local variables may include application extension 111 detecting that the task currently running on a thread has completed processing, and the current thread may be returned to a thread pool. To avoid unintentionally exposing data between tasks, all existing thread-local variables may be removed from the thread, prior to the thread being returned to thread pool 115 and assigned to another task. Thread-local manager 112 may provide a command, for example, the removeAll( ) method, enabling the removal of all thread-local variables using a single command. In some embodiments, the active thread invokes the removeAll( ) method corresponding to thread-local manager 112 to instruct thread-local manager 112 to remove (e.g., delete) all existing thread-local variables remaining on the current thread. In other embodiments, application extension 111 invokes the removeAll( ) method corresponding to thread-local manager 112 to instruct thread-local manager 112 to delete all existing thread-local variables remaining on the current thread. In another embodiment, thread pool manager 114 invokes the removeAll( ) method corresponding to thread-local manager 112 to instruct thread-local manager 112 to delete all existing thread-local variables remaining on the current thread. After all thread-local variables are removed from the thread, the thread may be returned to thread pool 115.

Figure 3:
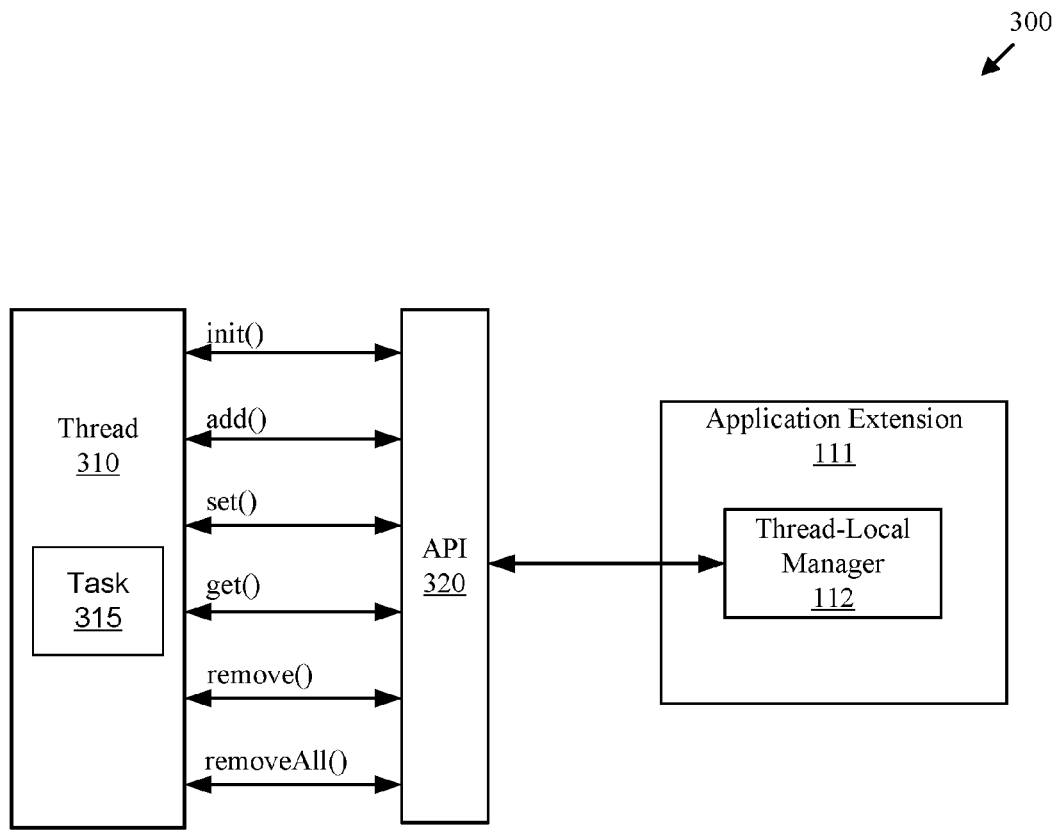
FIG. 3 depicts an example of a thread using an application extension to manage thread-local variables, in accordance with at least one embodiment of the present invention.

FIG. 3 depicts an example 300 of a thread using an application extension to manage thread-local variables, in accordance with an embodiment of the present invention. As depicted, example 300 includes a thread 310, an application programming interface (API) 320, and an application extension 111. In some embodiments, thread 310 is a thread dispatched from a thread pool (e.g., thread pool 115) to run task 315. In another embodiment, thread 310 is a thread that has been newly created to run task 315. At the time thread 310 is created, a singleton instance of thread-local manager 112 is also created within application extension 111. In some embodiments, thread 310 uses API 320 to instantiate an instance of thread-local manager 112.

In the depicted example, application extension 111 and thread-local manager 112 may reside in a portion of a server (e.g. server 110) that provides a global scope of visibility to all thread-local variables defined in thread 310 using API 320. Thread-local manager 112 implements the same functionality as is provided by the native thread-local class [e.g., methods such as init( ), add( ), set( ), get( ) and remove( )], and therefore can manipulate all thread-local variables corresponding to thread 310 via API 320. Thread-local manager 112 may also maintain structures (e.g., hashmaps) and references identifying each thread-local variable of which thread-local manager 112 is aware. Thread-local manager 112 may also implement additional function, such as a clean up method (e.g., the removeAll( ) method) that removes all thread-local variables defined in thread 310.

In one embodiment, when task 315 has completed processing, all thread-local variables are deleted before the thread is returned to a thread pool. In some embodiments, thread 310 invokes, via API 320, the method removeAll( ) corresponding to thread-local manager 112, and thread-local manager 112 deletes any remaining thread-local variable corresponding to thread 310. In other embodiments, application extension 111 detects that task 315 has completed, and invokes the removeAll( ) method corresponding to thread-local manager 112 prior to returning thread 310 to the thread pool.

Figure 4:
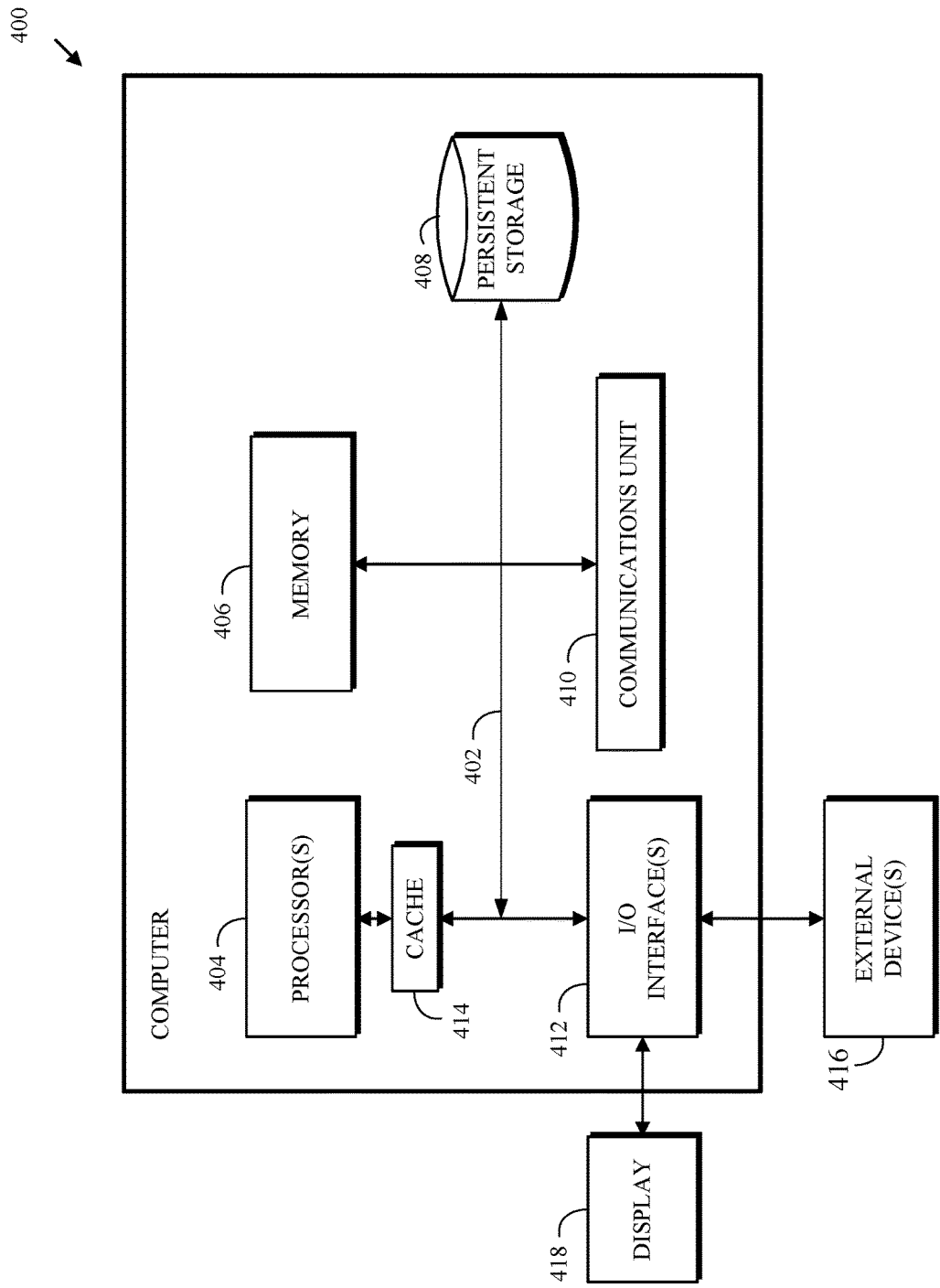
FIG. 4 is a functional block diagram depicting various components of one embodiment of a computer suitable for executing the methods disclosed herein.

FIG. 4 depicts a functional block diagram of components of a computer system 400, which is an example of systems such as server 110 and client 120 within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server 110 and client 120 include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., thread-local management method 200 are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server 110 and client 120. In these examples, communications unit 410 includes one or more network interface cards. Communications unit 410 may provide communications through the use of either or both physical and wireless communications links. Program instructions and data used to practice embodiments of thread-local management method 200 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    receiving a request to instantiate an instance of a thread-local manager for a particular thread-local variable of a particular thread, wherein the instance of the thread-local manager only has access to the particular thread-local variable;
    instantiating the instance of the thread-local manager;
    providing global visibility to the instance of the thread-local manager, wherein the global visibility enables the instance of the thread-local manager to manage all thread-local variables of the particular thread, wherein prior to providing the global visibility, all of the thread-local variables other than the particular thread-local variable are restricted to be managed by other corresponding instances of thread-local manager;
    calling the instance of the thread-local manager to manipulate all thread-local variables corresponding to the particular thread; and
    sending a single command to the instance of the thread-local manger to remove all the thread-local variables when the particular thread completes a task.

2. The method of claim 1, further comprising, implementing, by the instance of the thread-local manager, all capabilities corresponding to a native thread-local manager.

3. The method of claim 1, further comprising, restricting instantiation of the thread-local manager to a single instance corresponding to the particular thread-local variable of the particular thread.

4. The method of claim 1, wherein the manipulating thread-local variables comprises one or more of initializing, adding, setting, getting, and removing the thread-local variables.

5. The method of claim 1, further comprising providing, by the instance of the thread-local manager, a command to remove all of the thread-local variables.

6. The method of claim 1, wherein the task is part of a computer program that is ready to run.

* * * * *